(12) United States Patent
Hong et al.

(10) Patent No.: US 9,871,242 B2
(45) Date of Patent: Jan. 16, 2018

(54) COMPOSITE SEPARATOR FOR LITHIUM SECONDARY BATTERY, AND LITHIUM SECONDARY BATTERY USING THE COMPOSITE SEPARATOR

(71) Applicant: SAMSUNG SDI CO., LTD., Yongin-si, Gyeonggi-do (KR)

(72) Inventors: Chan Hong, Yongin-si (KR); Jeawoan Lee, Yongin-si (KR); Soomi Eo, Yongin-si (KR); Seunghee Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 34 days.

(21) Appl. No.: 14/921,849

(22) Filed: Oct. 23, 2015

(65) Prior Publication Data
US 2016/0164059 A1 Jun. 9, 2016

(30) Foreign Application Priority Data

Dec. 8, 2014 (KR) .................. 10-2014-0175377

(51) Int. Cl.
*H01M 2/16* (2006.01)
*H01M 10/052* (2010.01)

(52) U.S. Cl.
CPC ....... *H01M 2/1686* (2013.01); *H01M 2/1646* (2013.01); *H01M 2/1653* (2013.01); *H01M 10/052* (2013.01); *Y02T 10/7011* (2013.01)

(58) Field of Classification Search
CPC ............ H01M 2/1653; H01M 2/1686; H01M 2/1646; H01M 10/052
See application file for complete search history.

(56) References Cited

U.S. PATENT DOCUMENTS

| 2008/0274394 A1 | 11/2008 | Schormann et al. |
| 2010/0098974 A1 | 4/2010 | Kim et al. |
| 2010/0175245 A1 | 7/2010 | Do et al. |
| 2015/0056494 A1* | 2/2015 | Honda ............... H01G 11/52 429/145 |

FOREIGN PATENT DOCUMENTS

| KR | 10-2008-0043331 A | 5/2008 |
| KR | 10-2008-0106678 A | 12/2008 |
| KR | 10-2010-0044487 A | 4/2010 |

* cited by examiner

*Primary Examiner* — Jane Rhee
(74) *Attorney, Agent, or Firm* — Lewis Roca Rothgerber Christie LLP

(57) ABSTRACT

A composite separator and a lithium secondary battery including the composite separator, and the composite separator includes a separator; a first coating layer disposed on a surface of the separator and including a (meth)acrylic polymer and/or (meth)acrylic modified polyester resin; and a second coating layer disposed on another surface of the separator and including a vinylidene fluoride-based polymer.

18 Claims, 2 Drawing Sheets

COMPOSITE SEPARATOR FOR LITHIUM SECONDARY BATTERY, AND LITHIUM SECONDARY BATTERY USING THE COMPOSITE SEPARATOR

CROSS-REFERENCE TO RELATED APPLICATION

This application claims priority to and the benefit of Korean Patent Application No. 10-2014-0175377, filed on Dec. 8, 2014, in the Korean Intellectual Property Office, the disclosure of which is incorporated herein in its entirety by reference.

BACKGROUND

1. Field

One or more exemplary embodiments relate to a composite separator for a lithium secondary battery and a lithium secondary battery including the composite separator.

2. Description of the Related Art

Lithium secondary batteries have high voltage and high energy density, and thus have various device applications. Devices such as electric vehicles, including hybrid electric vehicles (HEVs) and plug-in-electric vehicles (PHEV), should be operable at high temperatures, be able to charge or discharge a large amount of electricity, and have long-term usability, and thus require lithium secondary batteries having high-discharge capacity and better lifetime characteristics.

A lithium secondary battery may be assembled by disposing a separator between a cathode and an anode. The separator may serve as a path for ions in the lithium secondary battery, and may prevent a short circuit by being between (in direct contact with) the cathode and the anode to separate the cathode from the anode.

To simplify the manufacturing process of lithium secondary batteries and protect a battery cell from being modified, there has been suggested a separator having both surfaces coated with an adhesive polymer to improve the binding strength to the cathode and anode.

However, when the suggested separators (which are each coated with an adhesive polymer) are used, it is difficult to realize homogeneous binding strength, thus, there is a need of an improvement in this regard.

SUMMARY

Aspects of one or more exemplary embodiments are directed toward a composite separator for a lithium secondary battery, the separator having improved binding strength to an electrode.

Aspects of one or more exemplary embodiments are directed toward a lithium secondary battery improved in charge-discharge efficiency and capacity retention rate by using the separator.

Additional aspects will be set forth in part in the description which follows and, in part, will be apparent from the description, or may be learned by practice of the presented embodiments.

According to one or more exemplary embodiments, a composite separator for a lithium secondary battery includes: a separator; a first coating layer disposed on a surface of the separator and including a (meth)acrylic polymer or (meth)acrylic modified polyester resin; and a second coating layer disposed on another surface of the separator and including a vinylidene fluoride-based polymer.

According to one or more exemplary embodiments, a lithium secondary battery includes: a cathode; an anode; and a composite separator disposed between the cathode and the anode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
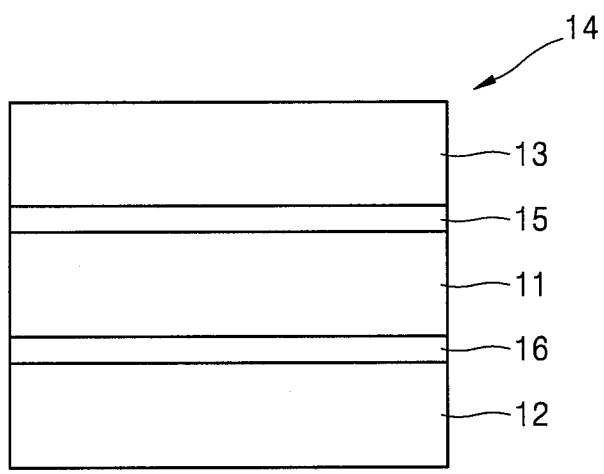
FIG. 1 is a sectional view of a composite separator for a lithium secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the inventive concept refers to "one or more embodiments of the inventive concept." Also, the term "exemplary" is intended to refer to an example or illustration. It will be understood that when an element or layer is referred to as being "on" another element or layer, it can be directly on the other element or layer, or one or more intervening elements or layers may be present. In contrast, when an element or layer is referred to as being "directly on" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §1 12, first paragraph, and 35

U.S.C. §132(a). As used herein, the terms "use," "using," and "used" may be considered synonymous with the terms "utilize," "utilizing," and "utilized," respectively.

Hereinafter, exemplary embodiments of a composite separator for a lithium secondary battery and a lithium secondary battery including the composite separator will be described in greater detail.

According to an exemplary embodiment, a composite separator may include a separator; a first coating layer disposed on a surface of the separator and including a (meth)acrylic polymer and/or (meth)acrylic modified polyester resin; and a second coating layer disposed on another surface of the separator and including a vinylidene fluoride-based polymer.

As described above, by coating different polymers respectively on both surfaces of the separator, binding strength between the composite separator and electrodes may be improved, thereby reducing deformation of a battery cell. The (meth)acrylic polymer and/or (meth)acrylic modified polyester resin may be at least one polymerization product of a (meth)acrylic monomer selected from the group consisting of methyl acrylate, ethyl acrylate, propyl acrylate, isopropyl acrylate, n-butyl acrylate, iso-butyl acrylate, n-amyl acrylate, iso-amyl acrylate, n-hexyl acrylate, 2-ethylhexyl acrylate, isobornyl acrylate, hydroxypropyl acrylate, hydroxyethyl acrylate, lauryl acrylate, 2-(((butoxyamino)carbonyl)oxy)ethyl(meth)acrylate, 2-(diethylamino)ethyl (meth)acrylate, 2-(dimethylamino)ethyl(meth)acrylate, 3-(diethylamino)propyl(meth)acrylate, 3-(dimethylamino) propyl(meth)acrylate, methyl 2-acetoamido(meth)acrylate, 2-(meth)acrylamidoglycolic acid, 2-(meth)acrylamido-2-methyl-1-propanesulfonic acid, (3-(meth)acrylamidopropyl) trimethyl ammonium chloride, N-(meth)acryloylamido-ethoxyethanol, 3-(meth)acryloylamido-1-propanol, N-(butoxymethyl)(meth)acrylamide, N-tert-butyl(meth) acrylamide, diacetone(meth)acrylamide, N,N-dimethyl (meth)acrylamide, N-(isobutoxymethyl)acrylamide, N-(isopropyl)(meth)acrylamide, (meth)acrylamide, N-phenyl (meth)acrylamide, N-(tris(hydroxymethyl)methyl)(meth) acrylamide, N,N'-(1,3-phenylene)dimaleimide, N,N'-(1,4-phenylene)dimaleimide, N,N'-(1,2-dihydroxyethylene) bisacrylamide, N,N'-ethylene-bis(meth)acrylamide, and N-vinylpyrrolidone.

The (meth)acrylic modified polyester resin may be a reaction product of a polyester resin and a (meth)acrylic monomer. Here, an amount of the (meth)acrylic monomer may be in a range of about 0.1 part by weight to about 30 parts by weight based, on 100 parts by weight of the polyester resin.

The vinylidene fluoride-based polymer may be at least one selected from the group consisting of polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene, fluoride-co-trifluoroethylene, polyvinylidene fluoride-co-trifluorochloroethylene, and polyvinylidene fluoride-co-ethylene.

The first coating layer may include polyvinylidene fluoride, the second coating layer may include the (meth)acrylic polymer or (meth)acrylic modified polyester resin, the first coating layer may be disposed opposite to a cathode of the lithium secondary battery, and the second coating layer may be disposed opposite to an anode of the lithium secondary battery.

A binder of the cathode may be formed using a material for forming the first coating layer or a material that is similar with the material for forming the first coating layer. In addition, a binder of the anode may be formed using a material for forming the second coating layer or a material that is similar with the material for forming the second coating layer. When a binder of each electrode and a coating layer that is adjacent to each electrode are formed using one material or materials similar to each other, binding strength between the electrode and the coating layer may improve.

The first coating layer may include the (meth)acrylic polymer and/or (meth)acrylic modified polyester resin, the second coating layer may include polyvinylidene fluoride, the first coating layer may be disposed to oppose the anode of the lithium secondary battery, and the second coating layer may be disposed to oppose the cathode of the lithium secondary battery.

The (meth)acrylic polymer may further include a repeating unit derived from the (meth)acrylic monomer.

According to an embodiment, the (meth)acrylic polymer may be an ethyl acrylate-acrylic acid-N,N-dimethylacrylamide copolymer and/or an ethyl acrylate-acrylic acid-2-(dimethylamino)ethyl acrylate copolymer.

A polyester resin used in preparing the (meth)acrylic modified polyester resin may be a reaction product of a polybasic acid and a polyalcohol.

The polyalcohol may include a diol and a triol.

The diol may include a 1,4-butanediol, a 1,3-butanediol, a 2,3-butanediol, a methylpropanediol, a methylpentanediol, a 1,6-hexanediol, a propylene glycol, a dipropylene glycol, a diethylene glycol, a neopentyl glycol, and/or a bisphenol A ethylene oxide adduct. The diol may be used alone or in a combination of at least two thereof. The triol may include, for example, a trimethylolpropane.

The polybasic acid may include at least one aliphatic acid selected from the group consisting of a phthalic acid, a tetrahydrophthalic acid, an anhydrous maleic acid, an adipic acid, a succinic acid, an azelaic acid, and/or a sebacic acid, and the polybasic acid may further include at least one selected from the group consisting of an isophtallic acid and a terephthalic acid.

For example, the (meth)acrylic monomer that is used in preparing the (meth)acrylic modified polyester resin may be at least one selected from the group consisting of a methacrylate, a glycidyl methacrylate, 2-hydroxyethyl methacrylate, 2-hydroxyethyl acrylate, a methacrylic acid, and an acrylic acid.

The separator with the first coating layer described above may not stick to itself since the first coating layer may not be sticky at room temperature and prevent a decrease in air permeability of the first coating layer and a decrease in mobility of lithium ions, and may improve the binding strength between the electrodes and the separator. The improved binding strength between the electrodes and the separator may facilitate migration of lithium ions at interfaces between the electrodes and the separator to improve a charge-discharge efficiency, may also be maintained even when it is used for a long time to improve lifespan characteristics, and may suppress shrinkage of the separator at high temperatures to improve thermal stability of the battery.

The first coating layer on the separator may be disposed to oppose the cathode of the first coating layer.

A surface of a porous base in the separator may be fully or partially coated with the first coating layer.

In some embodiments, the first coating layer may be formed on at least one selected from the entire surface of the porous base, some pores of the porous base, and all pores of the porous base.

In some embodiments, the first coating layer may be a dot-pattern layer including a plurality of dots arranged at a set or predetermined interval. This may further improve lithium ion permeability of the separator.

The dot-pattern layer as the first coating layer may be in any array pattern of dots in different shapes and different sizes, as long as the lithium ion transfer of the first coating layer and the binding strength to the electrode are maintained. For example, dots of the dot-pattern layer may be in any suitable shape, for example circular, triangular, rectangular, and/or elliptical shape. For example, the dots of the dot-pattern layer may be connected together to form a single dot.

The (meth)acrylic polymer may be a polymerization product of (meth)acrylic monomers. A monomer that is copolymerizable with the (meth)acrylic monomer as well as the (meth)acrylic monomer may be used. The term "polymerization" used herein may also include cross-linking reaction.

Examples of the monomer copolymerizable with the (meth)acrylic monomer are unsaturated carboxylic acids (including acrylic acid, methacrylic acid, itaconic acid, fumaric acid, maleic acid, and/or the like); carboxylic acid esters having at least two carbon-carbon double bonds (including diethylene glycol dimethacrylate, diethylene glycol dimethacrylate, trimethylolpropane, triacrylate, and/or the like); styrene-based monomers (including styrene, chlorostyrene, vinyl toluene, t-butyl styrene, vinyl benzoic acid, vinyl naphthalene, chloromethyl styrene, hydroxymethylstyrene, α-methylstyrene, divinylbenzene, and/or the like); amide-based monomers (including acrylamide, N-methylol acrylamide, acrylamide-2-methylpropane sulfonic acid, and/or the like); α,β-unsaturated nitrile compounds (including acrylonitrile, methacrylonitrile, and/or the like); olefins (including ethylene, propylene, and/or the like); diene-based monomers (including butadiene, isoprene, and/or the like); halogen atom-containing monomers (including vinyl chloride, vinylidene chloride, and/or the like); vinyl esters (including vinyl acetate, vinyl propionate, vinyl butyrate, vinyl benzoate, and/or the like); vinyl ethers (including allyl glycidyl ether, methyl vinyl ether, ethyl vinyl ether, butyl vinyl ether, and/or the like); vinyl ketones (including methyl vinyl ketone, ethyl vinyl ketone, butyl vinyl ketone, vinyl hexyl ketone, vinyl isopropenyl ketone, and/or the like); heterocyclic vinyl compounds (including N-vinyl pyrrolidone, vinyl pyridine, vinyl imidazole, and/or the like); and/or acrylonitrile. Any monomers known in the art to be copolymerizable with the ethylenically unsaturated carboxylic acid esters may be used.

For example, the monomer that is copolymerizable with the (meth)acrylic monomer may be at least one selected from the group consisting of carboxylic acid esters having at least two carbon-carbon double bonds, amide-based monomers, α,β-unsaturated nitrile compounds, and vinyl ethers.

A mixing ratio of the (meth)acrylic monomer and the monomer that is copolymerizable with the (meth)acrylic monomer may be at a mole ratio of about 0.1:99.9 to about 99.9:0.1.

The (meth)acrylic modified polyester resin may be a reaction product of a (meth)acrylic monomer and a polyester resin.

The polyester resin may be obtained by a condensation polymerization reaction of a polybasic acid and a polyalcohol. The condensation polymerization reaction may be performed by using, as a catalyst, a metal compound including at least one selected from the group consisting of cesium (Cs), tin (Sn), manganese (Mn), magnesium (Mg), and antimony (Sb). The metal compound may be, for example, a tin oxide and/or an antimony oxide.

The (meth)acrylic polymer and/or (meth)acrylic modified polyester resin may have an average molecular weight in a range of about 10,000 to about 1,000,000, for example, in a range of about 60,000 to about 500,000.

In some embodiments, the (meth)acrylic polymer or (meth)acrylic modified polyester resin may have a controlled glass transition temperature in a range of about 10° C. to about 60° C. by control of the composition of the monomers.

A polymerization initiator may be used. The polymerization initiator may be any polymerization initiator used in common emulsification polymerization, dispersion polymerization, and/or suspension polymerization. For example, the polymerization initiator may be persulfates (including potassium persulfate and/or ammonium persulfate); hydrogen peroxide; and/or organic peroxides (including benzoyl peroxide and/or cumene hydroperoxide). These polymerization initiators may be used alone or in a combination with a redox polymerization initiator that is a combination with a reducing agent, such as sodium sulfite, sodium thiosulfate, or ascorbic acid. For example, the polymerization initiator may be an azo compound, such as 2,2'-azobisisobutyronitrile (AIBN), 2,2'-azobis(2,4-dimethylvaleronitrile), 2,2'-azobis(4-methoxy-2,4-dimethylvaleronitrile), dimethyl-2, 2'-azobisisobutyrate, or 4,4'-azobis(4-cyanopentanoic acid); or an amidine compound, such as 2,2'-azobis(2-amino-dipropane)dihydrochloride, 2,2'-azobis(N,N'-dimethylene isobutyl amidine), or 2,2'-azobis(N,N'-dimethylene isobutyl amidine)dihydrochloride. The polymerization initiators may be used alone or in a combination of at least two thereof. The amount of the polymerization initiator may be in a range of about 0.01 part by weight to about 10 parts by weight, in some embodiments, about 0.1 part by weight to about 10 parts by weight, and in some other embodiments, about 0.1 part to about 5 parts by weight, based on 100 parts by weight of a total weight of the monomer.

Optionally and in certain embodiments, an anti-aging agent, an anti-staling agent, an anti-foaming agent, and/or a polymerization inhibitor may also be added in the copolymerization for the (meth)acrylic polymer and/or (meth) acrylic modified polyester resin.

The polymerization inhibitor may be any common polymerization inhibitor available in the art. For example, the polymerization inhibitor may be at least one selected from hydroquinone and benzoquinone.

The (meth)acrylic polymer and/or (meth)acrylic modified polyester resin may be a polymer particle-containing composition, for example, an aqueous emulsion. The aqueous emulsion refers to a dispersion of polymer particles in water.

The polymer particles in the aqueous emulsion may have an average particle diameter in a range of about 50 nm to about 500 nm, for example, about 200 nm. When the diameter of the polymer particles is within this range, a uniform aqueous emulsion without aggregation of particles may be obtained. A solid content in the aqueous emulsion may be in a range of about 10 wt % to about 50 wt %. When the solid content of the aqueous emulsion is within this range, the aqueous emulsion may be improved in coating workability and emulsion phase stability.

In some embodiments, the separator may include a second coating layer disposed on another surface of the porous base facing oppositely away from the first coating layer and including a (meth)acrylic polymer and/or (meth)acrylic modified polyester resin.

In some embodiments, the (meth)acrylic modified polyester resin may include a neopentyl glycol (NPG) in an amount ranging from about 20 parts by weight to about 40 parts by weight, a dipropylene glycol (DPG) in an amount ranging from about 0.1 part by weight to about 30 parts by weight, an isopropyl alcohol in an amount ranging from about 0.1 part by weight to about 30 parts by weight, an anhydrous maleic acid (MA) in an amount ranging from about 10 parts by weight to about 40 parts by weight, a methyl methacrylate (MMA) as a modifier in an amount ranging from about 0.1 part by weight to about 10 parts by weight, a styrene monomer diluent in an amount ranging from about 30 parts by weight to about 50 parts by weight, a polymerization initiator in an amount of about 0.1 part by weight, and a polymerization inhibitor in an amount ranging from about 0.1 part by weight to about 1 part by weight.

The second coating layer may be a dot-pattern layer including a plurality of dots arranged at a set or predetermined interval. The average diameter, interval, and average thickness of the dots in the second coating layer may be the same as those described in connection with the first coating layer.

A thickness ratio of the first coating layer and the second coating layer may be in a range of about 0.5:1 to about 2.0:1. A thickness of the first coating layer and the second coating layer may be in a range of about 0.01 µm to about 15 µm.

In some embodiments, the separator may further include an inorganic coating layer including an inorganic particle between the porous base and first coating layer and/or between the porous base and second coating layer. The inorganic coating layer may efficiently prevent or protect from thermal shrinkage of the porous base during use of the lithium secondary battery.

The porous base may be any common porous base that may be used in electrochemical devices. For example, the porous base may be a base formed on a membrane or fibrous base including one or at least two of polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyethylene oxide, polyacrylonitrile, a polyvinylidene fluoride-hexafluoropropylene copolymer, polyethylene, and polypropylene.

The porous base may have a thickness in a range of about 5 µm to about 20 µm, a pore size in a range of about 0.001 µm to about 0.1 µm, and a porosity in a range of about 10% to about 60%. However, the thickness, pore size, and porosity of the porous base may not be limited thereto. The pore size used herein refers to a pore diameter when the pore is in a circular-shape.

The inorganic particle of the inorganic coating layer may be any inorganic particle available in the art. For example, the inorganic particle may be at least one selected from α-alumina (α-$Al_2O_3$), γ-alumina (γ-$Al_2O_3$), boehmite (γ-AlO(OH)), gibbsite (γ-$Al(OH)_3$), colloidal silica, zirconium oxide, magnesium fluoride, $BaTiO_3$, $SnO_2$, $CeO_2$, MgO, NiO, CaO, ZnO, $Y_2O_3$, $TiO_2$, and SiC. The inorganic particles may have an average particle diameter in a range of about 0.1 µm to about 3 µm.

When the average particle diameter of the inorganic particles is within this range, the inorganic coating layer may have a uniform thickness and an appropriate (suitable) porosity.

In some embodiments, the separator may further include a third coating layer including an inorganic particle and a binder polymer between the porous base and first coating layer and/or between the porous base and second coating layer.

The binder polymer may be any binder polymer available in the art that is stable in an electrolyte solution and at an operating voltage of a lithium secondary battery. A non-limiting example of the binder is at least one selected from the group consisting of a (meth)acrylic acid ester-based polymer, polyethylene, polypropylene, an ethylene-propylene copolymer, polyvinyl chloride, polyvinylidene chloride, polystyrene, polyacrylonitrile, polytetrafluoroethylene, polymethyl methacrylate, polyvinyl acetate, polyisoprene, polychloroprene, polyester, polycarbonate, polyamide, polyacrylate, polymethylmethacrylate, polyurethane, an acrylonitrile-butadiene-styrene terpolymer, polyoxyethylene, polyoxymethylene, polyoxypropylene, a styrene-acrylonitrile copolymer, an acrylonitrile-styrene-acrylate terpolymer, a styrene-butadiene copolymer, an acrylated styrene-butadiene copolymer, an acrylonitril-butadiene copolymer, an acrylonitrile-butadiene-styrene terpolymer, acrylic rubber, butyl rubber, fluoro rubber, polyvinyl pyrrolidone, polyepichlorohydrin, polyphosphazene, an ethylene-propylene-diene terpolymer, polyvinyl pyridine, chlorosulfonated polyethylene, polysulfone, polyvinyl alcohol, polyvinyl acetate, thermoplastic polyester rubber (PTEE), carboxymethyl cellulose, hydroxypropyl methyl cellulose, hydroxypropyl cellulose, and diacetyl cellulose, but embodiments are not limited thereto.

For example, the binder polymer may be a polymer particle-containing composition including particles of such a polymer listed above dispersed in an aqueous solvent. The polymer particle-containing composition may be an aqueous emulsion. The polymer particles in the aqueous emulsion may have an average particle diameter in a range of about 50 nm to about 500 nm, for example, about 120 nm. When the diameter of the polymer particles are within this range, the binding strength may be excellent.

A solid content in the aqueous emulsion may be in a range of about 20 wt % to about 50 wt %. When the solid content of the aqueous emulsion is within this range, the aqueous emulsion may be improved in coating workability and emulsion phase stability.

An amount of the inorganic particles may be in a range of about 1 part by weight to about 20 parts by weight based on 100 parts by weight of the binder polymer. According to an embodiment, an amount of the inorganic particles may be in a range of about 0.01 part by weight to about 5 parts by weight based on 100 parts by weight of the porous base and the inorganic particles, for example, an amount of the inorganic particles may in a range of about 0.05 to about 0.5 part by weight. When the amount of the inorganic particles is within this range, shrinking of the separator may be prevented when the internal temperature of the battery rises, without a decrease in binding strength of the third coating layer to the porous base.

FIG. 1 is a sectional view illustrating a stacking structure of a composite separator for a lithium secondary battery according to an embodiment.

Referring to FIG. 1, a composite separator 14 includes a first coating layer 15 formed on a surface of a separator 11. The first coating layer 15 is disposed directly opposing (e.g., directly contacting) a cathode 13. A second coating layer 16 is formed on another surface of the separator 11, and the second coating layer 16 is disposed directly opposing (e.g., directly contacting) an anode 12.

According to an embodiment, the first coating layer 15 may be formed of polyvinylidene fluoride, and the second coating layer 16 may be formed of a (meth)acrylic polymer and/or (meth)acrylic modified polyester resin. The (meth)acrylic polymer and/or (meth)acrylic modified polyester resin may be, for example, formed of an acrylic monomer, such as cyclohexyl methacrylate (CHM), hydroxyethyl methacrylate (HEM), or methyl methacrylate (MMA).

According to another embodiment, the first coating layer 15 may be formed of the (meth)acrylic polymer and/or (meth)acrylic modified polyester resin, and the second coating layer 16 may be formed of polyvinylidene fluoride.

The separator 11 may be a porous polyethylene membrane or a porous membrane including alumina and polyethylene.

In some embodiments, a thickness of the composite separator may be in a range of about 10 µm to about 25 µm, for example, about 16 µm to about 22 µm. When the thickness of the composite separator is within these ranges, the separator may effectively separate the anode and the cathode from one another to prevent (protect from) a short circuit and may improve capacity of the lithium secondary battery.

Hereinafter, a method of manufacturing a separator according to an exemplary embodiment will be described.

First, a composition including a (meth)acrylic polymer and/or (meth)acrylic modified polyester resin may be coated on a surface of a porous base, and then dried to form a first coating layer. The first coating layer of the separator may be disposed to oppose a cathode of a lithium secondary battery. The drying may be performed at a temperature in a range of about 20° C. to about 85° C.

The composition including the (meth)acrylic polymer or (meth)acrylic modified polyester resin may be an aqueous emulsion of the (meth)acrylic polymer or (meth)acrylic modified polyester resin, and may also further include a solvent in addition to the aqueous emulsion. For example, the solvent may be water, acetone, tetrahydrofuran, methylene chloride, chloroform, dimethylformamide, N-methyl-2-pyrrolidone, cyclohexane, or one or more mixtures thereof.

A composition including a polyvinylidene fluoride may be coated on a surface of the porous base opposite to the first coating layer in the same manner as described in connection with the first coating layer to form a second coating layer.

The first coating layer and the second coating layer may be formed as dot-pattern layers. The first coating layer and the second coating layer as dot-pattern layers may improve ion permeability of the separator and characteristics of the lithium secondary battery.

A composition including inorganic particles may be coated between the porous base and the first coating layer and/or between the porous base and the second coating layer, and then dried to form an inorganic coating layer. The drying may be performed at a temperature in a range of about 20° C. to about 85° C.

The inorganic coating layer may be formed by coating the composition including inorganic particles by, for example, micro gravure coating and/or dip coating, to have a dry thickness in a range of about 3 µm to about 4 µm.

A composition including inorganic particles and a binder polymer may be coated between the porous base and the first coating layer and/or between the porous base and the second coating layer, and then dried to form a third coating layer.

The inorganic particle-containing composition and the inorganic particles and binder polymer-containing composition may each further include a solvent. A non-limiting example of the solvent may be acetone, tetrahydrofuran, methylene chloride, chloroform, dimethylformamide, N-methyl-2-pyrrolidone, cyclohexane, water, or one or more mixtures thereof.

The inorganic particles may be ground after being added to a binder polymer-containing solution. The grinding period of the inorganic particles may be in a range of about 1 hour to 20 hours, and the ground inorganic particles may have a particle diameter in a range of about 0.1 µm to about 3 µm as described above. The grinding may be performed by using a common method, for example, ball milling.

The coating of the first coating layer, the second coating layer, and the third coating layer may be performed by using a common coating method known in the art, for example, by using any of a variety of methods, such as dip coating, die coating, roll coating, comma coating, gravure coating, or one or more mixtures thereof.

The first coating layer and the second coating layer may be formed as dot-pattern layers. In order to form the first coating layer and the second coating layer as dot-pattern layers, for example, a first coating layer composition or a second coating layer composition may be coated by using a gravure roll having a dot pattern, and then drying the same. The drying may be performed at a temperature in a range of about 20° C. to about 85° C.

Hereinafter, a method of manufacturing a lithium secondary battery including the separator according to an exemplary embodiment will be described.

First, an anode active material, a conducting agent, a binder, and a solvent may be mixed to prepare an anode active material layer composition. The anode active material layer composition may be directly coated on a metallic current collector and dried to form an anode.

Alternatively, the anode active material layer composition may be cast on a separate support to form an anode active material layer, which may then be separated from the support and laminated on a metallic current collector to form an anode. The anode is not limited to the examples described above, and may be in any form available.

The anode active material may be a non-carbonaceous material. For example, the anode active material may include at least one selected from the group consisting of a metal that is alloyable with lithium, an alloy of the metal that is alloyable with lithium, and an oxide of the metal that is alloyable with lithium.

Examples of the metal alloyable with lithium include Si, Sn, Al, Ge, Pb, Bi, Sb, a Si—Y alloy (where Y may be an alkali metal, an alkali earth metal, a Group 13 to 16 element, a transition metal, a rare earth element, or combinations thereof except for Si), and a Sn—Y alloy (where Y is an alkali metal, an alkali earth metal, a Group 13 to 16 element, a transition metal, a rare earth element, or combinations thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or one or more combinations thereof.

For example, the transition metal oxide may be a lithium titanium oxide, a vanadium oxide, or a lithium vanadium oxide.

For example, the nontransition metal oxide may be $SnO_2$ or $SiO_x$ (where $0<x<2$).

For example, the anode active material may be at least one selected from the group consisting of Si, Sn, Pb, Ge, Al, $SiO_x$ (where $0<x\leq2$), $SnO_y$ (where $0<y\leq2$), $Li_4Ti_5O_{12}$, $TiO_2$, $LiTiO_3$, and $Li_2Ti_3O_7$, but embodiments are not limited thereto. The anode active material may be any non-carbonaceous anode active material available in the art.

In some embodiments, the anode active material may be a composite of a non-carbonaceous anode active material as listed above and a carbonaceous material. The anode active material may further include a carbonaceous anode active material as well as a non-carbonaceous material as listed above.

The carbonaceous material may be crystalline carbon, amorphous carbon, or one or more mixtures thereof. The crystalline carbon may be graphite, such as natural graphite or artificial graphite that is in non-shaped, plate, flake, spherical and/or fibrous form. The amorphous carbon may be soft carbon (carbon sintered at low temperatures), hard carbon, mesophase pitch carbides, and/or sintered corks.

The conducting agent may be acetylene black, ketjen black, natural graphite, artificial graphite, carbon black, carbon fiber, and/or metal powder and/or metal fiber of, for example, copper, nickel, aluminum, and/or silver. In some embodiments at least one conducting material such as polyphenylene derivatives may be used in combination, but embodiments are not limited thereto. Any conducting agent available in the art may be used. Any of the above-described crystalline carbonaceous materials may be added as the conducting agent.

Examples of the binder are, a vinylidene fluoride/hexafluoropropylene copolymer, polyvinylidene fluoride (PVDF), polyacrylonitrile, polymethylmethacrylate, polytetrafluoroethylene, one or more mixtures thereof, and/or a styrene butadiene rubber polymer, but embodiments are not limited thereto. Any material available as a binding agent in the art may be used.

Examples of the solvent are N-methyl-pyrrolidone, acetone, and water, but embodiments are not limited thereto. Any material available as a solvent in the art may be used.

The amounts of the anode active material, the conducting agent, the binder, and the solvent may be those levels that are generally used in lithium secondary batteries in the art. At least one of the conducting agent, the binder, and the solvent may not be used depending on the use and the structure of the lithium secondary battery.

In one embodiment, an anode is prepared according to the above-described anode manufacturing method.

Next, a cathode active material, a conducting agent, a binder, and a solvent may be mixed to prepare a cathode active material layer composition. The cathode active material layer composition may be directly coated on a metallic current collector and dried to form a cathode. Alternatively, the cathode active material layer composition may be cast on a support to form a cathode active material layer, which may then be separated from the support and laminated on a metallic current collector to form a cathode.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide, but embodiments are not limited thereto. Any cathode active materials available in the art may be used.

For example, the cathode active material may be a compound represented by one of the following formulae: $Li_aA_{1-b}B'_bD_2$ (where $0.90 \leq a \leq 1.8$, and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$, and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{p(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from the group consisting of nickel (Ni), cobalt (Co), manganese (Mn), and combinations thereof; B' is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F' is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as cathode active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or one or more mixtures thereof. The coating layer may be formed by using any method that does not adversely affect the physical properties of the cathode active material when a compound of the coating element is used. For example, the coating layer may be formed by using a spray coating method, and/or a dipping method. This should be apparent to those of skill in the art, and thus a detailed description thereof will be omitted.

For example, the cathode active material may be $LiNiO_2$, $LiCoO_2$, $LiMn_xO_{2x}$ (where $x=1$ or 2), $LiNi_{1-x}Mn_xO_2$ (where $0<x<1$), $LiNi_{1-x-y}Co_xMn_yO_2$ (where $0 \leq x \leq 0.5$ and $0 \leq y \leq 0.5$), $LiFeO_2$, $V_2O_5$, $TiS$, and/or $MoS$.

The conducting agent, binder, and solvent used in the cathode active material layer composition may be the same as those used in the anode active material layer composition described above. If required, a plasticizer may be further added to the cathode active material layer composition and/or the anode active material layer composition to form pores in the electrode plates.

The amounts of the cathode active material, the conducting agent, the binder, and the solvent may be those levels that are generally used in lithium secondary batteries in the art. At least one of the conducting agent, the binder, and the solvent may not be used depending on the use and the structure of the lithium secondary battery.

Next, a separator according to an exemplary embodiment is disposed between the cathode and the anode.

Next, an electrolyte is prepared.

For example, the electrolyte may be an organic electrolyte solution. Alternately, the electrolyte may be in a solid electrolyte. For example, the solid electrolyte may be boron oxide or lithium oxynitride, but embodiments are not limited thereto. Any material available as a solid electrolyte in the art may be used. The solid electrolyte may be formed on the anode by, for example, sputtering.

In some embodiments, an organic electrolyte solution may be prepared. The organic electrolyte solution may be prepared by dissolving a lithium salt in an organic solvent.

The organic solvent may be any solvent available as an organic solvent in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or one or more mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or one or more mixtures thereof.

Figure 2:
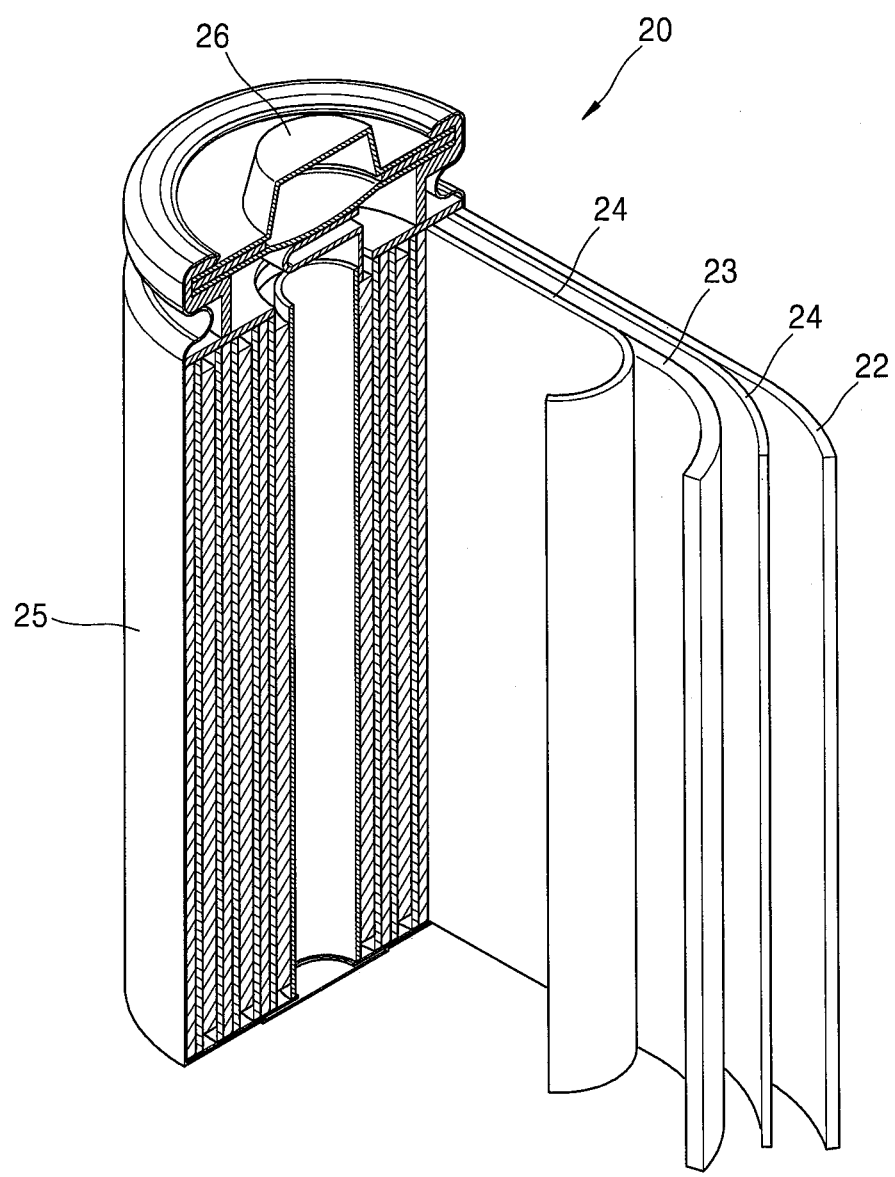
FIG. 2 is a schematic view of a lithium secondary battery according to another embodiment.

FIG. 2 is a schematic view of a lithium secondary battery according to another embodiment.

Referring to FIG. 2, the lithium secondary battery 20 includes a cathode 23, an anode 22, and a separator 24. The cathode 23, the anode 22, and the separator 24 are wound and/or folded, and then sealed in a battery case 25. Then, the battery case 25 is filled with an organic electrolyte solution and sealed with a cap assembly 26, thereby completing the manufacture of the lithium secondary battery 20. The battery case 25 may be a cylindrical case, a rectangular case, or a thin-film case. In some embodiments, the lithium secondary battery 20 may be a thin-film battery. In some embodiments, the lithium secondary battery 20 may be a lithium ion battery. In some embodiments, the lithium secondary battery 20 may be a lithium polymer battery.

The separator 24 may be disposed between the cathode 23 and the anode 22 to form a battery assembly. The electrode assembly may be rolled up or stacked. The electrode assembly may then be thermal-compressed at a temperature in a range of about 80° C. to about 120° C., for example, at a temperature in a range of about 100° C. to about 120° C.

Instead of rolling up the electrode assembly, the separator and electrodes may be laminated or stacked upon one another and then be folded.

When the temperature of the thermal compression is within these ranges, the binding strength between the separator and the electrodes may be improved.

Next, the thermal-compressed electrode assembly may be impregnated with an organic electrolyte, and then put into a pouch and sealed, thereby completing the manufacture of the lithium secondary battery 20.

Alternatively, a plurality of battery assemblies may be stacked to form a battery pack, which may be used in any device that requires high capacity and high output, for example, in a laptop computer, a smart phone, and/or an electric vehicle.

The lithium secondary battery 20 may have improved high-rate characteristics and lifespan characteristics, and thus may be applicable in an electric vehicle (EV), for example, in a hybrid vehicle such as a plug-in hybrid electric vehicle (PHEV).

The inventive concept will be described in further detail with reference to the following examples. These examples are for illustrative purposes only and are not intended to limit the scope of the inventive concept.

Example 1: Manufacture of Composite Separator

An aqueous emulsion of acrylic modified polyester resin was coated on a first surface of a porous polyethylene membrane (having a porosity of about 45%) having a thickness of about 18 µm by using a gravure coater to have a thickness of about 1.0 µm after drying, and then dried at about 80° C., thereby forming a first coating layer.

Next, a composition obtained by dissolving 100 g of polyvinylidene fluoride with 200 g of solvent N,N-dimethylacetamide was coated on a second surface of the porous polyethylene membrane by using a gravure coater to have a thickness of about 1.0 µm after drying, and then dried at about 80° C., thereby forming a second coating layer, thereby completing the manufacture of a composite separator. A thickness ratio of the first coating layer and the second coating layer was about 1:1.

The aqueous emulsion of acrylic modified polyester resin was manufactured according to a method described below. The acrylic modified polyester resin composition were prepared using a neopentyl glycol (NPG) in an amount ranging from about 20 parts by weight to about 40 parts by weight, dipropylene glycol (DPG) in an amount ranging from about 0.1 part by weight to about 30 parts by weight, isopropyl alcohol in an amount ranging from about 0.1 part by weight to about 30 parts by weight, anhydrous maleic acid (MA) in an amount ranging from about 10 parts by weight to about 40 parts by weight, metheylmethacrylate (MMA) in an amount ranging from about 0.1 part by weight to about 10 parts by weight, styrene monomer diluent in an amount ranging from about 30 parts by weight to about 50 parts by weight, 5 wt % ammonium persulfate, which is a polymerization initiator, in an amount of about 0.1 part by weight, and hydroquinone, which is a polymerization inhibitor, in an amount ranging from about 0.1 part by weight to about 1 part by weight.

Example 2: Manufacture of Composite Separator

A composite separator was manufactured in the same manner as in Example 1 except that an alumina coated porous polyethylene membrane was used instead of a porous polyethylene membrane.

Comparative Example 1: Manufacture of Separator

A composition obtained by dissolving 100 g of polyvinylidene fluoride with 200 g of solvent N,N-dimethylacetamide was coated on a first surface of a porous polyethylene membrane (having a porosity of about 45%) having a thickness of about 18 μm to have a thickness of about 1.0 μm after drying, and then dried at about 80° C., thereby forming a first coating layer. Next, a composition obtained by dissolving 100 g of polyvinylidene fluoride with 200 g of solvent N,N-dimethylacetamide was coated on a second surface of the porous polyethylene membrane by using a gravure coater to have a thickness of about 1.0 μm after drying, and then dried at about 80° C., thereby forming a second coating layer, thereby completing the manufacture of a separator.

Comparative Example 2: Manufacture of Separator

An aqueous emulsion of acrylic modified polyester resin was coated on a first surface of a porous polyethylene membrane (having a porosity of about 45%) having a thickness of about 18 μm by using a gravure coater to have a thickness of about 1.0 μm after drying, and then dried at about 80° C., thereby forming a first coating layer. Next, an acrylic modified polyester resin aqueous emulsion was coated on a second surface of the porous polyethylene membrane by using a gravure coater to have a thickness of about 1.0 μm after drying, and then dried at about 80° C., thereby forming a second coating layer, thereby completing the manufacture of a composite separator.

Manufacture Example 1: Manufacture of Lithium Secondary Battery $LiCoO_2$ as a cathode active material, polyvinylidene fluoride (PVDF) as a binder, and carbon as a conducting agent were mixed in a weight ratio of about 92:4:4, and then dispersed in N-methyl-2-pyrrolidon to prepare a cathode slurry. The cathode slurry was coated on an aluminum foil having a thickness of about 20 μm, dried, and then roll-pressed to prepare a cathode.

Artificial graphite as an anode active material, styrene-butadiene rubber as a binder, and carboxymethylcellulose as a thickening agent were mixed in a weight ratio of about 96:2:2, and then dispersed in water to prepare an anode active material slurry. The anode active material slurry was coated on a copper foil having a thickness of about 15 μm, dried, and then roll-pressed to prepare an anode.

The cathode, anode, and composite separator prepared in Example 1 were assembled to form a stacked cell (a stacked battery cell), which was then heat-pressed at about 90° C. at a pressure of 200 kgf for about 40 seconds to bind the cathode, anode, and composite separator together. In the composite separator, the polyvinylidene fluoride second coating layer was disposed to directly oppose (e.g., directly contact) the cathode, and the acrylic modified polyester resin first coating layer was disposed to directly oppose (e.g., directly contact) the anode.

The stacked cell was put into a pouch, and a mixed electrolyte solution of ethylene carbonate (EC), ethylmethylcarbonate (EMC), and diethylcarbonace (DEC) in a volume ratio of about 3:5:2, the mixed electrolyte solution including 1.3M of $LiPF_6$, was injected into the pouch, which was then vacuum-sealed, thereby completing the manufacture of a lithium secondary battery.

Manufacture Example 2: Manufacture of Lithium Secondary Battery

A lithium secondary battery was manufactured as in Manufacture Example 1, except that the polyvinylidene fluoride second coating layer of the composite separator prepared in Example 1 was disposed to directly oppose (e.g., directly contact) the anode, and the acrylic modified polyester resin first coating layer was disposed to directly oppose (e.g., directly contact) the cathode.

Manufacture Example 3: Manufacture of Lithium Secondary Battery

A lithium secondary battery was manufactured in the same manner as in Manufacture Example 1, except that the composite separator prepared in Example 2 was used instead of the composite separator prepared in Example 1.

Manufacture Example 4: Manufacture of Lithium Secondary Battery

A lithium secondary battery was manufactured in the same manner as in Manufacture Example 2, except that the composite separator prepared in Example 2 was used instead of the composite separator prepared in Example 1.

Comparative Manufacture Example 1 to 2: Manufacture of Lithium Secondary Batteries Lithium secondary batteries were manufactured in the same manner as in Manufacture Example 1, except that the separators prepared in Comparative Examples 1 and 2 were used, respectively, instead of the composite separator prepared in Example 1.

Evaluation Example 1: Measurement of Thickness of Battery Cell Before and After Charging/Discharging The lithium secondary batteries prepared in Manufacture Examples 1 to 4 and Comparative Manufacture Examples 1 and 2, manufactured as using the composite separators prepared in Examples 1 to 4 and Comparative Examples 1 and 2, respectively, were each charged with a constant current of 0.2 C rate at about 25° C. to a voltage of about 4.2 V, and then with a constant voltage of about 4.2 V to a current of about 0.01 C, followed by discharging with a constant current of 0.2 C to a voltage of 3.05 V (Formation process).

Subsequently, each of the lithium secondary batteries after the formation process was charged with a constant current of 0.5 C rate at about 25° C. to a voltage of about 4.2 V, and then with a constant voltage of about 4.2 V to a current of about 0.01 C, followed by discharging with a constant current of about 0.5 C to a voltage of about 3.0 V. This cycle of charging and discharging was repeated 500 times.

Cell thicknesses of Manufacture Examples 1 to 4 and Comparative Manufacture Examples 1 and 2 after charging and discharging is repeated 500 times, and initial cell thicknesses of Manufacture Examples 1 to 4 and Comparative Manufacture Examples 1 and 2 were measured, and the results thereof are described in Table 1.

TABLE 1

| | Initial cell thickness (mm) | Cell thickness after charging and discharging (mm) | | | Cell thickness increase rate after charging and discharging (%) | | |
|---|---|---|---|---|---|---|---|
| | | 100 cycle | 200 cycle | 300 cycle | 100 cycle | 200 cycle | 300 cycle |
| Manufacture Example 1 | 4.06 | 4.21 | 4.30 | 4.36 | 3.7 | 5.9 | 7.4 |
| Manufacture Example 2 | 4.05 | 4.22 | 4.30 | 4.38 | 4.1 | 6.1 | 8.1 |
| Manufacture Example 3 | 4.11 | 4.29 | 4.41 | 4.51 | 4.5 | 7.3 | 9.5 |
| Manufacture Example 4 | 4.09 | 4.28 | 4.41 | 4.51 | 4.6 | 7.9 | 10.2 |
| Comparative Manufacture Example 1 | 4.06 | 4.24 | 4.40 | 4.49 | 4.5 | 8.3 | 10.7 |
| Comparative Manufacture Example 2 | 4.05 | 4.22 | 4.40 | 4.52 | 4.2 | 8.7 | 11.5 |

Referring to Table 1, it was confirmed that the increase rates of cell thicknesses of Manufacture Examples 1 to 4 after charging and discharging is repeated 200 times and 300 times were relatively low compared to those of Comparative Manufacture Examples 1 and 2.

After repeating charging and discharging 100 times, the increase rate of cell thickness of the lithium secondary battery prepared in Comparative Manufacture Example 2 is low compared to those of Manufacture Examples 3 and 4. Alumina coated porous polyethylene membrane was used in preparing the cells of Manufacture Examples 3 and 4, and the alumina of the alumina coated porous polyethylene membrane was impregnated with electrolyte and caused the cell to swell, thereby increasing the cell thicknesses.

The results of charging and discharging lithium secondary batteries prepared in Manufacture Examples 1 to 4 and Comparative Manufacture Examples 1 and 2 are described in Table 2.

A charge-discharge efficiency at the $1^{st}$ cycle was calculated using Equation 1, and a capacity retention rate was calculated using Equation 2.

Charge-discharge efficiency=(Discharge capacity at $1^{st}$ cycle/Charge capacity at $1^{st}$ cycle)×100  Equation 1

Capacity retention rate=(Discharge capacity at $30^{th}$ cycle/Discharge capacity at $1^{st}$ cycle)×100  Equation 2

TABLE 2

| | Charge-discharge efficiency (%) | Capacity retention rate (%) |
|---|---|---|
| Manufacture Example 1 | 99.8 | 98.9 |
| Manufacture Example 2 | 99.7 | 98.6 |
| Manufacture Example 3 | 99.5 | 98.4 |
| Manufacture Example 4 | 99.3 | 98.3 |
| Comparative Manufacture Example 1 | 99.1 | 98.1 |
| Comparative Manufacture Example 2 | 99.0 | 97.8 |

Referring to Table 2, the lithium secondary batteries prepared in Manufacture Examples 1 to 4 were found to be improved in capacity retention rate and charge-discharge efficiency characteristics, compared to the lithium secondary batteries prepared in Comparative Manufacture Examples 1 and 2.

As described above, according to one or more of the exemplary embodiments, when the separator is used, homogeneous binding strength between the composite separator and the electrode is obtained, therefore, the lithium secondary battery including the separator may reduce deformation of a battery cell, and thus, the increase rate of cell thickness after charging and discharging is reduced, thereby improving lifespan characteristics of the battery.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A composite separator for a lithium secondary battery comprising:
    a separator;
    a first coating layer on a surface of the separator and comprising a (meth)acrylic polymer and/or (meth) acrylic modified polyester resin; and
    a second coating layer on another surface of the separator and comprising a vinylidene fluoride-based polymer,
    wherein the first coating layer and the second coating layer are different.

2. The composite separator of claim 1, wherein
    the first coating layer is disposed to oppose a cathode of the lithium secondary battery; and
    the second coating layer is disposed to oppose an anode of the lithium secondary battery.

3. The composite separator of claim 1, wherein
    the first coating layer is disposed to oppose an anode of the lithium secondary battery; and
    the second coating layer is disposed to oppose a cathode of the lithium secondary battery.

4. The composite separator of claim 1, wherein
    the (meth)acrylic polymer and/or (meth)acrylic modified polyester resin is at least one polymerization product of a (meth)acrylic monomer selected from the group consisting of methyl acrylate, ethyl acrylate, propyl acrylate, isopropyl acrylate, n-butyl acrylate, iso-butyl acrylate, n-amyl acrylate, iso-amyl acrylate, n-hexyl acrylate, 2-ethylhexyl acrylate, isobornyl acrylate, hydroxypropyl acrylate, hydroxyethyl acrylate, lauryl acrylate, 2-(((butoxyamino)carbonyl)oxy)ethyl(meth) acrylate, 2-(diethylamino)ethyl(meth)acrylate, 2-(dimethylamino)ethyl(meth)acrylate, 3-(diethylamino)propyl(meth)acrylate, 3-(dimethylamino)propyl(meth) acrylate, methyl 2-acetoamido(meth)acrylate, 2-(meth) acrylamidoglycolic acid, 2-(meth)acrylamido-2-methyl-1-propanesulfonic acid, (3-(meth) acrylamidopropyl)trimethyl ammonium chloride, N-(meth)acryloylamido-ethoxyethanol, 3-(meth)acryloylamido-1-propanol, N-(butoxymethyl)(meth) acrylamide, N-tert-butyl(meth)acrylamide, diacetone(meth) acrylamide, N,N-dimethyl(meth)acrylamide, N-(isobutoxymethyl)acrylamide, N-(isopropyl)(meth) acrylamide, (meth)acrylamide, N-phenyl(meth)acrylamide, N-(tris(hydroxymethyl)methyl)(meth)acrylamide, N,N'-(1,3-phenylene)dimaleimide, N,N'-(1,4-phenylene)dimaleimide, N,N'-(1,2-dihydroxyethylene) bisacrylamide, N,N'-ethylene-bis(meth)acrylamide, and N-vinylpyrrolidone.

5. The composite separator of claim 1, wherein
the vinylidene fluoride-based polymer is at least one selected from the group consisting of polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, and polyvinylidene fluoride-co-ethylene.

6. The composite separator of claim 1, wherein a thickness ratio of the first coating layer to the second coating layer is from about 0.5:1 to about 2:1.

7. The composite separator of claim 1, wherein
the separator is a porous base or comprises a porous base and an inorganic particle.

8. The composite separator of claim 7, wherein
the separator comprises the porous base and the inorganic particle,
the inorganic particle is at least one selected from colloidal silica, α-alumina (α-$Al_2O_3$), γ-alumina (γ-$Al_2O_3$), boehmite (γ-AlO(OH)), gibbsite (γ-Al(OH)$_3$), zirconium oxide, magnesium fluoride, $BaTiO_3$, $SnO_2$, $CeO_2$, MgO, NiO, CaO, ZnO, $Y_2O_3$, $TiO_2$, and SiC, and
an amount of the inorganic particle is in a range of about 0.01 part by weight to about 5 parts by weight based on 100 parts by weight of the total weight of the porous base and the inorganic particle.

9. The composite separator of claim 7, further comprising
an inorganic coating layer disposed in the porous base and the first coating layer or between the porous base and the first coating layer, wherein
the inorganic coating layer comprises an inorganic particle of at least one selected from colloidal silica, α-alumina (α-$Al_2O_3$), γ-alumina (γ-$Al_2O_3$), boehmite (γ-AlO(OH)), gibbsite (γ-Al(OH)$_3$), zirconium oxide, magnesium fluoride, $BaTiO_3$, $SnO_2$, $CeO_2$, MgO, NiO, CaO, ZnO, $Y_2O_3$, $TiO_2$, and SiC.

10. A lithium secondary battery comprising:
a cathode;
an anode; and
the composite separator of claim 1, disposed between the cathode and the anode.

11. The lithium secondary battery of claim 10, wherein
the first coating layer is disposed to oppose the cathode; and
the second coating layer is disposed to oppose the anode.

12. The lithium secondary battery of claim 10, wherein
the first coating layer is disposed to oppose the anode; and
the second coating layer is disposed to oppose the cathode.

13. The lithium secondary battery of claim 10, wherein
the (meth)acrylic polymer and/or (meth)acrylic modified polyester resin is at least one polymerization product of a (meth)acrylic monomer selected from the group consisting of methyl acrylate, ethyl acrylate, propyl acrylate, isopropyl acrylate, n-butyl acrylate, iso-butyl acrylate, n-amyl acrylate, iso-amyl acrylate, n-hexyl acrylate, 2-ethylhexyl acrylate, isobornyl acrylate, hydroxypropyl acrylate, hydroxyethyl acrylate, lauryl acrylate, 2-(((butoxyamino)carbonyl)oxy)ethyl(meth) acrylate, 2-(diethylamino)ethyl(meth)acrylate, 2-(dimethylamino)ethyl(meth)acrylate, 3-(diethylamino)propyl(meth)acrylate, 3-(dimethylamino)propyl(meth) acrylate, methyl 2-acetoamido(meth)acrylate, 2-(meth) acrylamidoglycolic acid, 2-(meth)acrylamido-2-methyl-1-propanesulfonic acid, (3-(meth) acrylamidopropyl)trimethyl ammonium chloride, N-(meth)acryloylamido-ethoxyethanol, 3-(meth)acryloylamido-1-propanol, N-(butoxymethyl)(meth) acrylamide, N-tert-butyl(meth)acrylamide, diacetone(meth) acrylamide, N,N-dimethyl(meth)acrylamide, N-(isobutoxymethyl)acrylamide, N-(isopropyl)(meth) acrylamide, (meth)acrylamide, N-phenyl(meth)acrylamide, N-(tris(hydroxymethyl)methyl)(meth)acrylamide, N,N'-(1,3-phenylene)dimaleimide, N,N'-(1,4-phenylene)dimaleimide, N,N'-(1,2-dihydroxyethylene) bisacrylamide, N,N'-ethylene-bis(meth)acrylamide, and N-vinylpyrrolidone.

14. The lithium secondary battery of claim 10, wherein
the vinylidene fluoride-based polymer is at least one selected from the group consisting of polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, and polyvinylidene fluoride-co-ethylene.

15. The lithium secondary battery of claim 10, wherein a thickness ratio of the first coating layer to the second coating layer is from about 0.5:1 to about 2:1.

16. The lithium secondary battery of claim 10, wherein
the separator is a porous base or comprises a porous base and an inorganic particle.

17. The lithium secondary battery of claim 16, wherein
the separator comprises the porous base and the inorganic particle,
the inorganic particle is at least one selected from colloidal silica, α-alumina (α-$Al_2O_3$), γ-alumina (γ-$Al_2O_3$), boehmite (γ-AlO(OH)), gibbsite (γ-Al(OH)$_3$), zirconium oxide, magnesium fluoride, $BaTiO_3$, $SnO_2$, $CeO_2$, MgO, NiO, CaO, ZnO, $Y_2O_3$, $TiO_2$, and SiC, and
an amount of the inorganic particle is in a range of about 0.01 part by weight to about 5 parts by weight based on 100 parts by weight of the total weight of the porous base and the inorganic particle.

18. The lithium secondary battery of claim 16 further comprising
an inorganic coating layer disposed in the porous base and the first coating layer or between the porous base and the first coating layer, wherein
the inorganic coating layer comprises an inorganic particle of at least one selected from colloidal silica, α-alumina (α-$Al_2O_3$), γ-alumina (γ-$Al_2O_3$), boehmite (γ-AlO(OH)), gibbsite (γ-Al(OH)$_3$), zirconium oxide, magnesium fluoride, $BaTiO_3$, $SnO_2$, $CeO_2$, MgO, NiO, CaO, ZnO, $Y_2O_3$, $TiO_2$, and SiC.

* * * * *